United States Patent
Yabui et al.

(10) Patent No.: US 6,903,164 B2
(45) Date of Patent: Jun. 7, 2005

(54) EPOXIDIZED THERMOPLASTIC POLYMERS AND PROCESSES FOR THEIR PRODUCTION

(75) Inventors: Akihiro Yabui, Ohtake (JP); Yoshihiro Ohtsuka, Ohtake (JP); Nobuyuki Watanabe, Ohtake (JP)

(73) Assignee: Daicel Chemical Industries, Ltd., Sakai (JP)

( * ) Notice: Subject to any disclaimer, the term of this patent is extended or adjusted under 35 U.S.C. 154(b) by 0 days.

(21) Appl. No.: 10/169,918

(22) PCT Filed: Nov. 12, 2001

(86) PCT No.: PCT/JP01/09869

§ 371 (c)(1),
(2), (4) Date: Nov. 7, 2002

(87) PCT Pub. No.: WO02/38626

PCT Pub. Date: May 16, 2002

(65) Prior Publication Data

US 2003/0139533 A1 Jul. 24, 2003

(30) Foreign Application Priority Data

Nov. 13, 2000 (JP) ..................................... 2000-345244
Nov. 27, 2000 (JP) ..................................... 2000-359124

(51) Int. Cl.$^7$ ............................................. C08C 19/06
(52) U.S. Cl. .................... 525/383; 525/331.9; 525/386; 525/387; 525/902
(58) Field of Search ............................. 525/331.9, 383, 525/386, 387, 902

(56) References Cited

U.S. PATENT DOCUMENTS 4,131,725 A * 12/1978 Udipi ......................... 525/386
6,031,054 A * 2/2000 Takai ....................... 525/331.7

FOREIGN PATENT DOCUMENTS

| EP | 0 498 426 A1 | 8/1992 | ............. C08F/8/08 |
|---|---|---|---|
| EP | 0 658 603 A2 | 6/1995 | ......... C08L/101/00 |
| JP | 8-104709 | 4/1996 | ............. C08F/8/08 |
| JP | 8-120022 | 5/1996 | ............. C08F/8/08 |
| JP | 9-67502 | 3/1997 | ........... C08L/53/02 |
| JP | 9-95512 | 4/1997 | ............. C08F/6/06 |
| JP | 9-165418 | 6/1997 | ............. C08F/8/08 |
| JP | 9-208617 | 8/1997 | ............. C08F/8/08 |
| JP | 10-316715 | 12/1998 | ............. C08F/8/08 |
| JP | 11-292927 A | 10/1999 | ............. C08F/8/08 |
| JP | 2000-44798 | 2/2000 | ........... C08L/79/04 |
| JP | 2001-48921 | 2/2001 | ............. C08F/8/12 |
| JP | 2001-278913 | 10/2001 | ............. C08F/8/08 |

OTHER PUBLICATIONS

Machine Translation of JP 2001–048921, Miki, Feb. 2001, obtained from JPO website.*
Machine Translation of JP 2001–278913, Takai, Oct. 2001, obtained from JPO website.*
Machine Translation of JP 2001–048921, Mihara, Nov. 1998, obtained from JPO website.*

* cited by examiner

Primary Examiner—Jeffrey B. Robertson
(74) Attorney, Agent, or Firm—Morgan & Finnegan, LLP

(57) ABSTRACT

An epoxidized granular thermoplastic polymer which comprises a shell-like surface layer insoluble in toluene at 25° C. is formed on the polymer, and a process for the production of the epoxidized granular thermoplastic polymer characterized in that the process comprises: the first step of epoxidizing a granular thermoplastic polymer in a water medium in the presence of an epoxidizing agent or the epoxidizing agent and a solvent for accelerating an epoxidation reaction and a phosphoric acid series compound; the second step of the washing with water, or the neutralization and washing with water of the epoxidized granular thermoplastic polymer; and the third step, if necessary, of removing the solvent for accelerating epoxidation reaction which may be used in the first step, as well as a process for the production of an epoxidized thermoplastic polymer, characterized in that under the condition in which thermoplastic polymer (A) in the solid-state is dispersed or suspended in water (B), the thermoplastic polymer (A) is epoxidized by a peroxide (C) with the dispersed or suspended state maintained.

22 Claims, No Drawings

US 6,903,164 B2

EPOXIDIZED THERMOPLASTIC POLYMERS AND PROCESSES FOR THEIR PRODUCTION

TECHNICAL FIELD

The invention of the first group relates to an epoxidized granular thermoplastic polymer having a solvent-resistant shell-like surface layer, which polymer is used mainly as a modifier for use in coating compositions, synthetic resins, rubber compositions, adhesives and the like, and a process for producing the same.

More specifically, it relates to an epoxidized granular thermoplastic polymer on which, in an epoxidation by the use of the double bonds in molecular chains of diene polymers and the like, a shell-like surface layer insoluble in a solvent is formed by carrying out the epoxidation by using the granular thermoplastic polymer under the condition in which the polymer is dispersed or suspended in water, and a process for producing the same.

The second group of this invention relates to a process for the production of an epoxidized thermoplastic polymer for use in coating ingredients, resin modifiers, rubber modifiers, adhesive ingredients and the like.

More specifically, it relates to a process for the production of an epoxidized thermoplastic polymer for use in the above various uses, in which in an epoxidation of the double bonds in molecules of the thermoplastic polymer, the epoxidation is carried out under the condition in which the thermoplastic polymer is dispersed or suspended in water.

In addition, it relates to a process for the production of an epoxidized thermoplastic polymer, which process enables conducting an epoxidation reaction of an thermoplastic polymer which is in a dispersed state in the form of, for example, pellets under the condition in which the disperse system that prevents blocking in water is maintained, by specifying characteristics, kinds, amounts and the like of a reaction accelerator used, and enables recovering the epoxidized thermoplastic polymer in the state of a high concentration of solid contents and also in the form of pellets, crumbs, powder, etc.

BACKGROUND ART

As methods for obtaining an epoxidized diene polymer by oxidizing a diene polymer as the target of an epoxidation, the following conventional methods have been known.

(1) A method of producing percarboxylic acid by reacting hydrogen peroxide with a lower carboxylic acid such as formic acid, acetic acid, etc., adding the percarboxylic acid to the reaction system as an epoxidizing agent to carry out an epoxidation reaction in the presence of or in the absence of a solvent.

(2) A method of epoxidizing by hydrogen peroxide in the presence of a catalyst such as an osmium salt, tungstic acid, etc. and a solvent.

Both of the above methods (1) and (2) are characterized by being carried out by dissolving the epoxidation target diene polymer in a solvent in order to conducting the epoxidation reaction efficiently.

However, these methods have complexity in the step of dissolving in a solvent, the step of washing treatment with water for removing carboxylic acids that are by-products after the epoxidation reaction and the step of removing solvent, thereby making the recovery of the product extremely difficult. Particularly, when the epoxidation target diene polymer is a rubber polymer, the epoxidized product has a high viscosity, and hence it is a problem that the product has extremely poor workability in handling it. And also concerning the form of the epoxidized polymer, some cases become a veil form that cannot be a raw material for molding such as powder, crumbs, pellets, etc. after the epoxidation. As a result, the use of the epoxidized polymer is often restricted in case of where the epoxidized polymer is added or kneaded to be used as a modifier.

With respect to a process for the production of an epoxidized diene polymer, for example, Japanese Unexamined Patent Publication No. 8-120022 proposes a method for obtaining an epoxidized diene polymer through the following steps: (1) the step of mixing a diene polymer or its partially hydrogenated product with an organic solvent to obtain a slurry or a solution of the polymer in an organic solvent; (2) the step of epoxidizing unsaturated carbon-carbon bonds present in a diene polymer by an epoxidizing agent; (3) the step of neutralizing and/or washing with water the solution thus obtained after the above epoxidation reaction; (4) the step of stripping a solution of the epoxidized block copolymer obtained through above steps having the concentration of the polymer is 5 to 50% by weight in the presence of a surfactant at the boiling point of the organic solvent, or at a temperature of the azeotropic point or more and 120° C. or less in case that the solvent and water give rise to azeotropy, thereby obtaining a slurry in which the polymer is dispersed in water; (5) the step of dewatering the crumb of the epoxidized diene block copolymer containing moisture thus obtained through the above steps to make the moisture content 1 to 30% by weight; and (6) the step of drying the epoxidized diene block copolymer through the above steps to make the moisture content 1% by weight or less.

Moreover, Japanese Unexamined Patent Publication No. 9-60479 discloses a process for the production of an epoxidized diene polymer, which process uses a screw extruder type squeezing dehydrator in the drying step of the above (6), and Japanese Unexamined Patent Publication No. 9-95512 proposes a process for the production of an epoxidized diene block copolymer, which process comprises supplying the epoxidized block copolymer obtained in the above step (3) to a evaporator, thereby evaporating the organic solvent directly to remove the organic solvent. Japanese Unexamined Patent Publication No. 8-104709 also proposes the process to improve the content of gels. However, these processes require large-sized facilities and hence they are not economical, so industrial implementation of these processes is difficult.

Furthermore, these processes are all the invention related to an epoxidized block copolymer produced by a homogeneous method that epoxidizes after dissolving a polymer as a raw material in a solvent. The characteristics of these processes for the production relate to a process for the production of a modified polymer having a quality that the content of gels is especially small. In addition, the epoxidized block copolymer obtained by these processes has a comparatively low softening point, thereby causing a problem during the production, processing, transportation or use of the copolymer, which problem is, for example, that the pellets of the epoxidized block copolymer cause blocking on the surfaces one another or tight adhesion to one another so that we have trouble handling them.

As a method for improving the above processes, Japanese Unexamined Patent Publication No. 9-165418 proposes a method of epoxidizing in a heterogeneous system by dispersing or suspending an organic polymer pellet and the like in an organic solvent system. However, the method uses ethyl acetate, hexane, etc. as organic solvents, which dissolve or swell a raw material resin, so pellets and the like are partly dissolved or swelled so that the pellets bring about a blocking state (mass state), thereby causing problems about facilities in the step of evacuating an epoxidized product.

Additionally, some polymer raw materials are dissolved in a solvent as an epoxidation proceeds, so the problem is caused that pellets give rise to blocking one another as the epoxidation proceeds in a similar manner as above. Besides, quantities of organic solvents are used as a solvent used in a reaction system, which is problematic from the viewpoint of the recovery operation of the organic solvents.

Japanese Unexamined Patent Publication No. 9-67502 proposes a method of adding a blocking inhibitor to the epoxidized copolymer obtained in a post-step.

Japanese Unexamined Patent Publication No. 9-208617 proposes a chemically modified diene polymer composition and a process for producing the same, which process comprises producing a polymer composition by epoxidizing a polymer in the state of particles having a size of 0.05 to 10 $\mu$m in water. However, this is the process for the production of the polymer composition, and no mention is made of the recovery performance of an epoxidized polymer or improvement in the blocking property of the epoxidized polymer.

Japanese Unexamined Patent Publication No. 10-316715 describes obtaining an aqueous dispersion of a polymer containing an epoxy-modified isoprene polymer, which the dispersion is excellent in mechanical stability as a dispersion and adhesiveness of a coat, by epoxidizing with peracetic acid an aqueous dispersion of an isoprene polymer in which isoprene units in the polymer are linked by trans-1,4 bond.

Japanese Unexamined Patent Publication No. 2000-44708 describes the invention related to a method for treating a surface of a rubber product in which an unvulcanized or vulcanized rubber product is surface-treated with an aqueous solution in the presence of a peracid to epoxidize the surface layer of the rubber product, thereby giving the non-adherence, lubricity and other barrier effects.

PROBLEMS OF THE INVENTION

From the viewpoint of the problems in the prior art as stated above, a problem to be solved of the invention of the first group is to provide an epoxidized granular thermoplastic polymer and a process for the producing the same, which polymer is obtained by epoxidizing a thermoplastic polymer such as diene polymers and the like, and can be used as a modifier and the like for use in general synthetic resins or one component of a synthetic resin composition, and also overcomes complexity in handling it, which is based on adherence and the like that the conventional epoxidized products usually have.

In addition, concerning the above process for the production, it is to provide an alternative method to the epoxy-modifying method that has conventionally been carried out, that is, the method of epoxidizing the above thermoplastic polymer such as diene polymers and the like dissolved in a solvent.

Furthermore, the invention of the second group, in obtaining an epoxidized thermoplastic polymer by oxidizing an epoxidation target thermoplastic polymer, presupposes to avoid various problems happening when the reaction is carried out with the epoxidation target thermoplastic polymer dissolved in a solvent. More specifically, a problem to be solved is to provide methods for an epoxidation reaction in the solid state, formation and purification of an epoxidation target thermoplastic polymer.

DISCLOSURE OF THE INVENTION

The inventors of the invention of the first group have conducted researches to solve the above problems, and it has consequently been found a process for the production of an epoxidized granular thermoplastic polymer that overcomes the problems such as blocking, adhesion and the like by means of giving solvent resistance to the surface of a thermoplastic polymer in the stage of an epoxidation reaction.

Specifically, it has been found that in a system that granules such as pellets, powder, etc. of a thermoplastic polymer are directly dispersed or suspended in water as it is, by epoxidizing the polymer by peracetic acid, a phosphoric acid series compound and preferably a reaction accelerator in addition, and also by forming a shell-like surface layer that is solvent-resistant, which specifically means insoluble in toluene at 25° C. on the granules, not only an epoxidation reaction in water can proceed in the form of a dispersed state, but also drying can be carried out with the appearance and morphology of the polymer subjected to the epoxidation maintained, thereby the shell-like surface layer is formed on the final modified granular thermoplastic polymer so that an epoxidized thermoplastic polymer that is hard to cause a blocking state among the granules can be produced. The present invention (the invention of the first group) bases its completion on the above finding. The summary of the invention of the first group is mentioned as follows.

The invention 1 of the first group of the present invention relates to an epoxidized granular thermoplastic polymer, characterized in that the polymer comprises a shell-like surface layer insoluble in toluene at 25° C. formed on the polymer.

The invention 2 of the first group of the present invention relates to an epoxidized granular thermoplastic polymer according to the invention 1, characterized in that the particle size converted into a sphere of the thermoplastic polymer is in the range of 0.05 to 7 mm.

The invention 3 of the first group of the present invention relates to an epoxidized granular thermoplastic polymer according to the invention 1 or 2, wherein the thermoplastic polymer is a diene polymer.

The invention 4 of the first group of the present invention relates to an epoxidized granular thermoplastic polymer according to the invention 3, wherein the diene polymer is at least one diene polymer selected from the group consisting of a butadiene polymer, a styrene-butadiene copolymer, an isoprene polymer, a styrene-isoprene copolymer and an acrylonitrile-butadiene copolymer.

The invention 5 of the first group of the present invention relates to an epoxidized granular thermoplastic polymer according to any one of the inventions 1 to 4, wherein the oxirane oxygen content in the epoxidized granular thermoplastic polymer is in the range of 0.3 to 5.0% by weight.

The invention 6 of the first group of the present invention relates to an epoxidized granular thermoplastic polymer according to any one of the inventions 1 to 5, wherein the content of gels in the epoxidized granular thermoplastic polymer is 0.1% by weight or more.

The invention 7 of the first group of the present invention relates to a process for the production of an epoxidized granular thermoplastic polymer according to the invention 1, the process comprising: the first step of epoxidizing a granular thermoplastic polymer in a water medium in the presence of an epoxidizing agent or the epoxidizing agent and a solvent for accelerating an epoxidation reaction, and a phosphoric acid series compound to produce an epoxidized granular thermoplastic polymer; the second step of the washing with water, or the neutralization and washing with water of the epoxidized granular thermoplastic polymer; and the third step, if necessary, of removing the solvent for accelerating the epoxidation reaction which may be used in the first step.

The invention 8 of the first group of the present invention relates to a process for the production of an epoxidized granular thermoplastic polymer according to the invention 7, wherein peracetic acid is used as the epoxidizing agent in the first step.

The invention 9 of the first group of the present invention relates to a process for the production of an epoxidized granular thermoplastic polymer according to the invention 7 or 8, wherein the SP value of the solvent for accelerating the epoxidation reaction that may be used in the first step is 10 or less.

The invention 10 of the first group of the present invention relates to a process for the production of an epoxidized granular thermoplastic polymer according to the invention 7, wherein the washing with water, or the neutralization and washing with water in the second step is a separation operation of solid and liquid for separating the polymer to be supplied to the third step.

The invention 11 of the first group of the present invention relates to a process for the production of an epoxidized granular thermoplastic polymer according to the invention 7, wherein the removing of the solvent in the third step is carried out by drying the polymer obtained in the second step with the granular form of the polymer maintained.

The invention 12 of the first group of the present invention relates to a process for the production of an epoxidized granular thermoplastic polymer according to any one of the inventions 7 to 11, wherein the oxirane oxygen content in the epoxidized granular thermoplastic polymer is in the range of 0.3 to 5.0% by weight.

The invention 13 of the first group of the present invention relates to a process for the production of an epoxidized granular thermoplastic polymer according to any one of the inventions 7 to 12, wherein the content of gels in the epoxidized granular thermoplastic polymer is 0.5% by weight or more.

The inventors of the invention of the second group have conducted research to solve the above problems, and it has consequently been found that under the condition that a diene polymer is dispersed or suspended in water in the form of pellets, powder, etc. such that a solid state is maintained, an epoxidation reaction is carried out preferably in a system in which the solubility parameter value (SP value) is defined for a diene polymer of a raw material, whereby the epoxidation reaction in water can proceed without causing blocking among pellets and the like, and also an epoxidized diene polymer can be obtained in a solid state such as pellets, crumbs, powder, etc. The present invention (the invention of the second group) bases its completion on the above finding. The summary of the invention of the second group is mentioned as follows.

The invention 1 of the second group of the present invention relates to a process for the production of an epoxidized thermoplastic polymer, characterized in that under the condition in which a thermoplastic polymer (A) in the solid-state is dispersed or suspended in water (B), the thermoplastic polymer (A) is epoxidized by a peroxide (C) with the dispersed or suspended state maintained.

The invention 2 of the second group of the present invention relates to a process for the production of an epoxidized thermoplastic polymer (A) according to the invention 1, wherein the particle size converted into a sphere of the thermoplastic polymer (A) is in the range of 0.05 to 7 mm.

The invention 3 of the second group of the present invention relates to a process for the production of an epoxidized thermoplastic polymer according to the invention 1, wherein the thermoplastic polymer (A) is at least one polymer selected from the group consisting of a butadiene polymer, a styrene-butadiene copolymer, an isoprene polymer, a styrene-isoprene copolymer, an acrylonitrile-butadiene copolymer, an ethylene-propylene-diene terpolymer and partially hydrogenated products of these diene polymers or copolymers.

The invention 4 of the second group of the present invention relates to a process for the production of an epoxidized thermoplastic polymer according to any one of the inventions 1 to 3, wherein in addition to the peroxide (C), a reaction accelerator (D) is further used.

The invention 5 of the second group of the present invention relates to a process for the production of an epoxidized thermoplastic polymer according to the invention 4, wherein one or more organic solvents that can dissolve or swell the thermoplastic polymer (A) are used as the reaction accelerator (D).

The invention 6 of the second group of the present invention relates to a process for the production of an epoxidized thermoplastic polymer according to the invention 4 or 5, wherein an organic solvent having a solubility parameter of less than 9.0 is used as the reaction accelerator (D) and 50 to 1000 parts by weight of water (B) and 0.5 to 20 parts by weight of the reaction accelerator (D) are used in terms of 100 parts by weight of the thermoplastic polymer (A).

The invention 7 of the second group of the present invention relates to a process for the production of an epoxidized thermoplastic polymer according to the invention 6, wherein the reaction accelerator (D) is a single or mixed solvent of one or more solvents selected from the group consisting of cyclohexane, toluene and xylene.

The invention 8 of the second group of the present invention relates to a process for the production of an epoxidized thermoplastic polymer according to any one of the inventions 4 to 5, wherein the thermoplastic polymer (A) is styrene-butadiene copolymer and also a linear or branched polymer represented by the general formula: a–(b–a)$_n$ (n≧1, a is polystyrene, and b is polybutadiene or its partially hydrogenated product), and 50 to 1000 parts by weight of water (B) and 0.5 to 30 parts by weight of the reaction accelerator (D) which is an organic solvent having a solubility parameter of 9.0 or more are used in terms of 100 parts by weight of thermoplastic polymer (A).

The invention 9 of the second group of the present invention relates to a process for the production of an epoxidized thermoplastic polymer according to the invention 4 or 5, wherein the thermoplastic polymer (A) is at least one polymer, copolymer, mixture of copolymers or mixture thereof selected from the group consisting of (1) a styrene-butadiene copolymer represented by the general formula: (a–b)$_m$ (m≧2, a is polystyrene, and b is polybutadiene or its partially hydrogenated product, hereinafter meant in the same way), (2) a mixture of styrene-butadiene copolymers represented by the general formula a–(b–a)$_n$ (n≧=1), respectively, and the above general formula (a–b)$_m$, (3) a butadiene polymer, (4) an isoprene polymer, (5) a styrene-isoprene copolymer, (6) an acrylonitrile-butadiene copolymer, (7) an ethylene-propylene-diene terpolymer, and (8) partially hydrogenated products of one or more members optionally selected from (1) to (7), and 50 to 1000 parts by weight of water (B) and 0.5 to 100 parts by weight of the reaction accelerator (D) which is an organic solvent having a solubility parameter of 9.0 or more used in terms of 100 parts by weight of the thermoplastic polymer (A).

The invention 10 of the second group of the present invention relates to a process for the production of an epoxidized thermoplastic polymer according to the invention 8 or 9, wherein the reaction accelerator (D) is a single or mixed solvent of one or more solvents selected from the group consisting of ethyl acetate, tetrahydrofuran, benzene, methyl ethyl ketone and chloroform.

The invention 11 of the second group of the present invention relates to a process for the production of an epoxidized thermoplastic polymer according to any one of the inventions 1 or 10, wherein peracetic acid, or other percarboxylic acid derived by hydrogen peroxide is used as the peroxide (C).

The invention 12 of the second group of the present invention relates to a process for the production of an epoxidized thermoplastic polymer according to the invention 11, wherein peracetic acid is used as the peroxide (C).

The invention 13 of the second group of the present invention relates to a process for the production of an epoxidized thermoplastic polymer according to any one of the inventions 3 to 12, wherein the peroxide (C) diluted with the reaction accelerator (D) is used.

The invention 14 of the second group of the present invention relates to a process for the production of an epoxidized thermoplastic polymer according to any one of the inventions 1 to 13, wherein the temperature of the epoxidation reaction of the thermoplastic polymer (A) is in the range of 10 to 70° C.

The invention 15 of the second group of the present invention relates to a process for the production of an epoxidized thermoplastic polymer according to any one of the inventions 1 to 14, wherein the oxirane oxygen content derived from the epoxy groups in the epoxidized thermoplastic polymer is controlled in the range of 0.1 to 5.0% by weight.

The invention 16 of the second group of the present invention relates to a process for the production of an epoxidized thermoplastic polymer according to any one of the inventions 1 to 15, wherein the content of gels in the epoxidized thermoplastic polymer is controlled in the range of 5% by weight or less.

BEST MODE FOR CARRYING OUT THE INVENTION

The contents of the invention of the first group are illustrated in detail as follows.

The epoxidation target thermoplastic polymer according to the process for the production of the present invention may be either a solid-state resin or a solid-state rubber polymer, and a rubber polymer is particularly preferred because the effect obtained by applying the present invention is great, considering that it is more difficult to apply the conventional method of dissolving the polymer in a solvent to a rubber polymer. Furthermore, the epoxidation target thermoplastic polymer is not particularly restricted as long as the polymer has double bonds based on diene monomers in the molecule.

Specific examples of the homopolymers of the epoxidation target thermoplastic polymers according to the present invention include a polybutadiene (BR), a polyisoprene rubber, and a dicyclopentadiene (DCPD) resin and a cyclopentadiene (CPD) resin that are polymers of an alicyclic diene monomer. Furthermore, typical structural examples of copolymers of the above thermoplastic polymers include a random copolymer obtained from a mixture of two or more kinds of diene monomers, a block copolymer of two or more kinds of diene homopolymers as well as copolymers of at least one diene monomer and other comonomers, for example, vinyl aromatic hydrocarbon compounds and olefinic compounds.

Specific examples of the copolymers of the above thermoplastic polymers are explained as follows.

Typical examples of the monomers constituting the thermoplastic polymers according to the present invention include butadiene and isoprene, so with respect to thermoplastic polymers, the following explanations are centered on both of these.

Other monomers that are copolymerized with butadiene or isoprene include other conjugated dienes, vinyl compounds and the like.

Other conjugated dienes that can be copolymerized with butadiene include, for example, isoprene, 1,3-pentadiene, 2,3-dimethyl-1,3-butadiene, 3-butyl-1,3-octadiene, phenyl-1,3-butadiene and the like. These other conjugated dienes may be used singly or in combination with two or more.

Furthermore, other conjugated dienes that can be copolymerized with isoprene include, for example, butadiene, 1,3-pentadiene, 2,3-dimethyl-1,3-butadiene, 3-butyl-1,3-octadiene, phenyl-1,3-butadiene and the like. These other conjugated dienes may be used singly or in combination with two or more.

Furthermore, vinyl compounds that can be copolymerized with butadiene or isoprene include, for example, styrene, and as alkyl-substituted styrenes such as α-methylstyrene, o-methylstyrene, m-methylstyrene, p-methylstyrene, p-tertiary butylstyrene and the like; alkoxy-substituted styrenes such as o-methoxystyrene, m-methoxystyrene, p-methoxystyrene and the like; vinyl aromatic compounds such as divinylbenzene, 1,1-diphenylstyrene and the like; unsaturated monocarboxylate such as methyl (meth) acrylate, ethyl (meth)acrylate, n-propyl (meth)acrylate, i-propyl (meth)acrylate, n-butyl (meth)acrylate, i-butyl (meth)acrylate, sec-butyl (meth)acrylate, t-butyl (meth) acrylate, lauryl (meth)acrylate, methyl crotonate, ethyl crotonate, methyl cinnamate, ethyl cinnamate and the like; fluoroalkyl (meth)acrylates such as 2,2,2-trifluoroethyl (meth)acrylate, 3,3,3,2,2-pentafluoropropyl (meth)acrylate, 4,4,4,3,3,2,2-heptafluorobutyl (meth)acrylate and the like; (meth)acryloyl group-containing siloxanyl compounds such as 3-(trimethylsiloxanyldimethylsilyl)propyl (meth) acrylate, 3-[tris(trimethylsiloxanyl)silyl]propyl (meth) acrylate, di-[3-(meth)acryloylpropyl]dimethylsilyl ether and the like; mono- or di-(meth) acrylates of alkylene glycols such as ethylene glycol, 1,2-propanediol, 1,3-propanediol, 1,6-hexanediol and the like; alkoxyalkyl (meth)acrylates such as 2-methoxyethylene (meth)acrylate, 2-ethoxyethyl (meth)acrylate, 3-methoxypropyl (meth)acrylate, 3-ethoxypropyl (meth)acrylate and the like; cyanoalkyl (meth)acrylates such as 2-cyanoethyl (meth)acrylate, 3-cyanopropyl (meth)acrylate and the like; oligo (meth) acrylates such as di-, tri- or tetra(meth)acrylates and the like of polyhydric alcohols of trivalent or more such as glycerin, 1,2,4-butanetriol, pentaerythritol, trimethylolalkane (the carbon number of the alkane is, for example, 1 to 3) and the like; vinylcyanide compounds such as (meth)acrylonitrile, α-chloroacrylonitrile, vinylidene cyanide and the like; unsaturated amides such as (meth)acrylamide, N-methylol (meth)acrylamide, N,N'-methylenebis(meth)acrylamide, N,N'-ethylenebis(meth)acrylamide and the like; hydroxyalkyl (meth)acrylates such as 2-hydroxyethyl (meth) acrylate, 2-hydroxypropyl (meth)acrylate and the like; hydroxyalkyl esters of unsaturated monocarboxylic acids such as 2-hydroxyethyl crotonate, 2-hydroxypropyl crotonate, 2-hydroxyethyl cinnamate, 2-hydroxypropyl cinnamate and the like; unsaturated alcohols such as (meth)allyl alcohol and the like; unsaturated monocarboxylic acids such as (meth)acrylic acid, crotonic acid, cinnamic acid and the like; unsaturated polycarboxylic acids (anhydrides thereof) such as maleic acid (maleic anhydride), fumaric acid, itaconic acid (itaconic anhydride), citraconic acid and the like; mono- or di-esters of the above unsaturated polycarboxylic acids; epoxy group-containing unsaturated compounds such as (meth)allyl glycidyl ether, glycidyl (meth)acrylate and the like, as well as vinyl chloride, vinyl acetate, sodium isoprenesulfonate, dicyclopentadiene, ethylidenenorbornene and the like. These vinyl compounds may be used singly or in combination with two or more.

Copolymers of butadiene and copolymers of isoprene that are typical examples of the copolymers belonging to the thermoplastic polymers according to the present invention may be either a random copolymer or a block copolymer as already explained as typical structures of copolymers.

However, as the thermoplastic polymer to be epoxidized in the present invention, a random copolymer of butadiene and styrene, a random copolymer of butadiene and (meth) acrylonitrile, a block copolymer of butadiene and styrene, a random copolymer of isoprene and styrene, a random copolymer of isoprene and (meth)acrylonitrile, and a block copolymer of isoprene and styrene, as well as copolymers of butadiene and isoprene are preferred. The copolymers of butadiene and isoprene may contain optionally vinyl compounds such as styrene, (meth) acrylonitrile and the like.

The content of butadiene in a copolymer of butadiene and the content of isoprene in a copolymer of isoprene are usually 0.5 to 99.5% by weight, preferably 1 to 95% by weight, and more preferably 5 to 90% by weight. In a copolymer of butadiene and isoprene as a specific copolymer, the content of butadiene is usually 0.5 to 99.5% by weight, preferably 1 to 95% by weight, and more preferably 5 to 90% by weight, and the content of isoprene is usually 0.5 to 99.5% by weight, preferably 1 to 95% by weight, and more preferably 5 to 90% by weight, and the content of a vinyl compound that may be used optionally is usually 0 to 99% by weight, preferably 0 to 95% by weight, and more preferably 0 to 90% by weight.

The weight-average molecular weights of a homopolymer or a copolymer of butadiene, and of a copolymer of isoprene as the epoxidation target polymer according to the present invention are preferably 1,000 to 5,000,000, and particularly preferably 5,000 to 500,000.

In the case where the epoxidation target polymer according to the present invention is a copolymer, it may be either a random copolymer or a block copolymer, or there is a case of a copolymer with other comonomers as already mentioned. In the case where the copolymer is a random copolymer, an ethylene-propylene-diene terpolymer (EPDM) is preferred, and in addition, the terpolymers having an iodine value of about 100 to about 500 among its properties can suitably be used widely as an epoxidation target thermoplastic polymer.

In the case where the epoxidation target polymer according to the present invention is a block copolymer, the compositions of the copolymers include, for example, a polystyrene-polybutadiene block copolymers, a polystyrene-polybutadiene-polystyrene block copolymers (SBS), a polystyrene-polyisoprene-polystyrene block copolymers (SIS), a polyacrylonitrile-polybutadiene block copolymers (NBR) and the like. Moreover, concerning these diene polymers, a partially hydrogenated product which a part of the diene components is hydrogenated may be used. The molecular structure of these block copolymers may be of a liner, branched or radial structure. Furthermore, the average molecular weight of the block copolymer is not particular restricted, but a molecular weight such that the polymer is insoluble in organic solvents having a low molecular weight is preferred. In general, polymers having a number average molecular weight in the range of 10,000 to 300,000 are preferred. The terminal groups of the resin or the rubber polymer used as an epoxidation target thermoplastic polymer are not particularly restricted.

A resin or a rubber polymer used as an epoxidation target thermoplastic polymer according to the present invention requires being in solid state at a temperature of the epoxidation reaction. The term "in the solid state at a temperature of the epoxidation reaction" means that the form of the polymer is not substantially changed by stirring at the reaction temperature so as to be in a state maintaining the form of powder or granules, or, conversely, it means that the form of the polymer is not in liquid or paste state that changes its form at this reaction temperature.

Additionally, the epoxidation target thermoplastic polymer is preferably in the form of commercially available pellets in view of handling and the ease of solid-liquid separation in the second step of the process for the production of the present invention. For the size of pellets, the average particle size is preferably in the range of 0.05 to 7 mm, particularly preferably of 0.1 to 7 mm on the basis of a converted size into a sphere. The particle size converted into a sphere is defined as a diameter of a sphere having the same volume as the average volume of the thermoplastic polymer. In order to carry out an epoxidation reaction efficiently, it may grind an epoxidation target thermoplastic polymer to increase the surface area of the polymer in advance. The method for grinding may a method of grinding with a normal grinding machine. In the case where the epoxidation target organic polymer is a rubber polymer, it is preferred to grind by the freezing grinding method. In this case, concerning the particle size of the ground granules, the average particle size is also preferably 0.05 mm or more from the same viewpoint of as mentioned above. The form of the pellets is not particular restricted. The form may be of a sphere, cube, rectangular parallelepiped, column, prism, cone, pyramid, hemisphere, rugby ball, egg or cotton form, or of a combination thereof. In any form of the pellets, the average particle size converted into a sphere is preferably in the above range.

The process for the production according to the invention of the first group is illustrated as follows.

The process for the production of the present invention comprises: the first step of epoxidizing a granular thermoplastic polymer in a water medium in the presence of an epoxidizing agent such as a peracid and the like, or the epoxidizing agent and a solvent for accelerating epoxidation reaction to produce an epoxidized granular thermoplastic polymer; the second step of the washing with water, or the neutralization and washing with water of the epoxidized granular thermoplastic polymer; and the third step, if necessary, of removing the solvent for accelerating epoxidation reaction which may be used in the first step.

In the epoxidation reaction of the first step, water is used as a dispersing medium of a granular thermoplastic polymer. As an epoxidizing agent, peracetic acid is preferably used singly or in combination with its organic solvent. A phosphoric acid series compound, and an organic solvent are preferably used as a reaction accelerator in addition. Furthermore, the organic solvent that serves as the solvent of peracetic acid may serve also as an organic solvent as a reaction accelerator.

The second step comprises the washing with water, or the neutralization and washing with water, in which the polymer is separated by solid-liquid separation, thereby supplying the polymer to the third step.

In the next third step, the polymer obtained in the second step is dried with its granular shape maintained, thereby recovering an epoxidized granular modified thermoplastic polymer having a shell-like surface layer.

Furthermore, in the epoxidation reaction by adding a peracid in the first step, at least on the surface of a granular polymer, ring opening of epoxy groups accompanying with the reaction with a by-product carboxylic acid, and subsequent crosslinking reactions which are presumed to conduct crosslinking of a hydroxyl group and an epoxy group and/or radical crosslinking of diene components by a peracid take place, whereby a shell-like surface layer that has excellent solvent resistance (for example, resistance to toluene at 25° C.) and is also chemically stable is formed. This shell-like surface layer inhibits blocking and the like among granules, and contributes to improvement in handling of an epoxidized granular thermoplastic polymer.

Use of a phosphoric acid series compound in an epoxidation reaction is preferred since it has the effect on the formation of a shell-like surface layer on an epoxidized granular thermoplastic polymer.

The present invention is characterized in that the epoxidized granular thermoplastic polymer thus obtained as mentioned above can be obtained, which polymer is characterized in that the polymer comprises a shell-like surface layer insoluble in toluene at 25° C. formed on the polymer. The formation of such a shell-like surface layer can prevent not only blocking of the granular thermoplastic polymer during an epoxidation reaction in the water disperse system, but also blocking of the granular thermoplastic polymer during a drying steps, and further, blocking during transportation, storage and use as a product.

An organic solvent suitably used as a reaction accelerator in conducting an epoxidation reaction varies depending on the kind of the epoxidation target polymer and the condition of an epoxidation reaction, and has the functions of epoxidizing even the inside of a diene polymer by infiltrating and transporting a peroxide as an epoxidizing agent into the inside of the diene polymer and the like in solid state, and of. Thus an organic solvent is chosen on the basis that the organic solvent can dissolve and swell the epoxidation target polymer, and can infiltrate into the inside of the polymer. Therefore organic solvents having a solubility parameter (SP) value of 10 or less are preferably selected. Organic solvents having a solubility parameter value of 10 or more have poor performance of dissolving, swelling and infiltrating in terms of the epoxidation target polymer.

Organic solvents suitably used in conducting an epoxidation reaction include linear or branched hydrocarbons such as hexane, octane and the like, or alkyl-substituted derivatives thereof; alicyclic hydrocarbons such as cyclohexane, cycloheptane and the like, or alkyl-substituted derivatives thereof; aromatic hydrocarbons or alkyl-substituted aromatic hydrocarbons such as benzene, naphthalene, toluene, xylene and the like, aliphatic carboxylate such as methyl acetate, ethyl acetate and the like; halogenated hydrocarbons such as chloroform and the like; and heterocyclic compounds such as tetrahydrofuran and the like. of these, cyclohexane, ethyl acetate, chloroform, toluene, benzene, xylene, hexane, tetrahydrofuran and the like are preferred from the viewpoint of the capability that the solvent can dissolve a peroxide as an epoxidizing agent to use, and the solubility of the epoxidation target polymer and ease of the subsequent recovery of the organic solvent. These may be used singly or as a mixture of two or more.

The reaction accelerator in conducting an epoxidation reaction has the performance of dissolving, swelling and infiltrating in terms of the epoxidation target polymer as mentioned above, so increase in the amount of the reaction accelerator used causes blocking among the polymer molecules, whereby the reaction in the water disperse system characterizing the present invention becomes unable to proceed. That is, dissolution of the surface of the pellets takes place, and blocking among the organic polymer molecules occurs, and as a result, stirring and taking out of a product from a reaction vessel cannot be carried out. The occurrence of blocking is also affected by the kind of a granular thermoplastic polymer; the ratio of water used to the granular thermoplastic polymer and the reaction temperature, and does not depend on only a reaction accelerator. Accordingly, the amount of the reaction accelerator used is determined considering the condition that blocking does not occur. The ratio of water used in terms of 100 parts by weight of the granular thermoplastic polymer is usually in the range of 50 to 1000 parts by weight, and in this case, the ratio of the reaction accelerator used in most is preferably in the range of 100 parts by weight or less, particularly preferably of 80 parts by weight or less.

Peroxides used as an epoxidizing agent include percarboxylic acids such as performic acid, peracetic acid, perpropionic acid and the like. With respect to these peroxides, an epoxidation can be carried out in a system where peroxides containing moisture are used, which are derived by hydrogen peroxide. Among these peroxides, peracetic acid is preferred from the viewpoint of causing efficient progression of an epoxidation.

In the case where percarboxylic acids are used as an epoxidizing agent, it is preferred to use percarboxylic acids dissolved in a solvent. Solvents for percarboxylic acids include hydrocarbons such as hexane and the like, organic acid esters such as ethyl acetate and the like, and aromatic hydrocarbons such as toluene and the like. The effect of these solvents on an epoxidation reaction is similar to the reaction accelerator described above, that is, these solvents infiltrate into the inside of the epoxidation target thermoplastic polymer so as to accelerate an epoxidation reaction, and therefore it is preferred to use these solvents. However, in the case where the organic solvent used as a solvent of peroxide is an organic solvent that also functions as a reaction accelerator, it is necessary to consider the amount of the solvent used, in addition to the amount of the above reaction accelerator used of the present invention.

In a system where hydrogen peroxide or peroxide derived by hydrogen peroxide is used, there are two methods of epoxidation. One is a method of previously reacting hydrogen peroxide with a lower carboxylic acid such as formic acid, acetic acid and the like to produce a percarboxylic acid, and adding the resulting percarboxylic acid as an epoxidizing agent to a system comprising a solid-state thermoplastic polymer, a water medium and a solvent for accelerating an epoxidation reaction to conduct epoxidation reaction. The other is a method of epoxidizing by hydrogen peroxide in the presence of a catalyst such as a salt of osmium, tungstic acid and the like and a solvent. Solvents that can be used in this case include those listed above.

In the present invention, phosphoric acid series compounds preferably used in an epoxidation reaction include inorganic phosphoric acids and organic phosphoric acids and salts thereof, and preferably acidic phosphate or salts thereof. Inorganic phosphoric acids used include hypophosphorous acid, metahypophosphorous acid, orthohypophosphorous acid, metaphosphoric acid, orthophosphoric acid, pyrohypophosphorous acid, pyrophosphoric acid, tripolyphosphoric acid, tetrapolyphosphoric acid, hexametaphosphoric acid and salts thereof. Examples of suitable acidic phosphoric esters include monomethyl phosphate, monoisopropyl phosphate, monobutyl phosphate, monoamyl phosphate, mono-2-ethylhexyl phosphate, mononyl phosphate, monoisodecyl phosphate, monocetyl phosphate, monomyristyl phosphate, monophenyl phosphate and monobenzyl phosphate, dialkyl phosphates such as dibutyl phosphate, di-2-hexyl phosphate and the like, and dibutyl hydrogenphosphite and the like. From the viewpoint of industrial availability, useful phosphoric acids include from a hydrated phosphoric acid to pure phosphoric acid, that is, phosphoric acids having the purity of about 70% to about 100%, and preferably phosphoric acids having the purity of about 85% or more. Various phosphoric acid equivalents in the condensed forms, for example, polymerized partial anhydrides or esters of phosphoric acid, pyrophosphoric acid, tripolyphosphoric acid and the like are used. Of these, sodium salt, phosphoric esters and the salt thereof of tripolyphosphoric acid are preferably used. The amount of these phosphoric acid series compounds used is preferably 0.005 to 1 parts by weight, more preferably 0.01 to 0.5 parts by weight in terms of 100 parts by weight of a granular thermoplastic polymer.

In epoxidizing according to the process for the production of the present invention, the oxirane oxygen content of the epoxidized product obtained can be controlled by means of changing a reaction mole ratio between the number of double bonds in the epoxidation target thermoplastic polymer and the epoxidizing agent. This reaction mole ratio is chosen preferably in the range of 1.0 to 3.0, and particularly preferably of 1.1 to 2.5. The oxirane oxygen content of the epoxidized granular thermoplastic polymer obtained by the production process of the present invention is preferably 0.3 to 5.0% by weight.

Furthermore, in epoxidizing according to the process for the production of the present invention, gels derived from the epoxidized product obtained are generated mainly on the surface of the granules to form a shell-like surface layer on the surface because the epoxidation according to the process for the production of the present invention proceeds from the surface. The content of the gels is evaluated as a ratio of the insoluble portion in toluene at 25° C. (the ratio to the whole sample of the epoxidized granular thermoplastic polymer, hereinafter in the same manner). The content of gels is preferably 0.1% by weight or more, more preferably, 0.3% by weight or more, and most preferably, 0.5% by weight or more. Concerning the upper limit, since the epoxidized product of the present invention is used as a modifying resin for other resins, the following conditions of the epoxidation are controlled so that the upper limit is preferably 30% by weight or less, more preferably 20% by weight or less.

The reaction temperature in epoxidizing an epoxidation target thermoplastic polymer according to the process for the production of the present invention can be chosen in the range of 10 to 70° C., although it depends on the kind of the epoxidation target thermoplastic polymer, the size of the surface area, the kind of the solvent, the kind and amount of the epoxidizing agent, and the reaction time. If the reaction temperature is lower than 10° C., it is not practical because the reaction rate is small. Conversely, if it exceeds 70° C., it is not preferred because autolysis of the peroxide becomes considerable, furthermore, it is problematic because dissolution of the surface of the epoxidation target thermoplastic polymer due to an organic solvent proceeds, thereby causing blocking. Particularly preferable reaction temperature is in the range of 30 to 60° C.

The pressure in the reaction system is usually under atmospheric pressure, and it may be under a slightly reduced pressure, or may be under slightly pressure.

The reaction time in epoxidizing an epoxidation target thermoplastic polymer according to the process for the production of the present invention can be usually chosen in the range of 1 to 24 hours, although it depends on the kind of the epoxidation target thermoplastic polymer, the size of the surface area, the kind of the solvent, the kind and amount of the epoxidizing agent, and the reaction temperature. If the reaction time is shorter than 1 hour, it is not practical because the conversion of double bonds is low. Conversely, if it is 24 hours or longer, it is not preferred because, for example, in the case of using peracetic acid as peroxide, a side reaction of the thermoplastic polymer takes place, thereby leading to decrease in a yield. Additionally, concerning an epoxidizing agent and/or a reaction accelerator, the total amount may be charged at a time, however, it is preferred to charge the total amount in limited amounts several times and continuously (including dropping).

According to the process for the production of the present invention, the reaction liquid after finishing the epoxidation reaction is in the state where the epoxidized thermoplastic polymer obtained is dispersed or suspended as solid granules in water or an organic solvent, usually in water. Furthermore, a shell-like surface layer insoluble in a specific organic solvent is formed on the surface of the solid granules, and as a result, the reaction liquid is obtained as a suspension in which a carboxylic acid is dissolved in water or a solvent. In order to separate and recover the resulting epoxidized product in the form of solid granules from the suspension, methods of filtration, centrifugal separation and the like may be employed. The resulting epoxidized product in the form of solid granules thus separated and recovered is washed with water to remove a solvent, a carboxylic acid and the like that are attached on the surface.

It is preferred to go to the next step, that is, a step of removing a solvent, after adding a heat-resistant stabilizer to the epoxidized thermoplastic polymer in the form of solid granules separated by the above method. This is because the addition of the heat-resistant stabilizer is effective for preventing the polymer from suffering deterioration by oxidation and heat in removing a solvent. These heat-resistant stabilizers may be directly added to the solid granules of the product as it is, or may be dissolved in a hydrocarbon solvent to be added.

As a heat-resistant stabilizer, conventionally known materials such as phenol stabilizers, phosphorus stabilizers and the like may be employed. These stabilizers are used preferably in the amount of 0.01 to 3 parts by weight more preferably of 0.05 to 3 parts by weight, and particularly preferably of 0.1 to 2 parts by weight in terms of 100 parts by weight of the polymer.

The above phenol stabilizers may be used in combination with two or more. If the amount of the phenol stabilizers used is less than 0.01 parts by weight, the effect on improvement in heat resistance and color tone is poor. Conversely if the amount exceeds 3 parts by weight, the effect exceeding the scope of the present invention is not exerted.

Subsequently the product obtained is dried to obtain an epoxidized granular thermoplastic polymer having a crosslinked shell-like surface layer of which surface is resistant to a specific organic solvent. The term "drying of the product" used herein means that at least one dryer such as a vacuum dryer, a hot air dryer and the like is used so that an organic solvent is directly removed from the granular thermoplastic polymer obtained, thereby reducing the moisture content to be less than 1% by weight. In the process for the production according to the present invention, it is not particular restricted on the drying, so long as the drying is carried out by a method of drying with the granular form of the above polymer maintained In addition, in the process for the production of a crosslinked epoxy-modified granular thermoplastic polymer according to the present invention, various additives, for example, softeners such as oils and the like, plasticizers, antistatic agents, lubricants, ultraviolet absorbers, flame retardants, pigments, inorganic fillers, organic or inorganic fibers, reinforcing agents such as carbon black and the like, other thermoplastic resins, and the like are added depending on purposes. It is preferred that these additives are added before conducting the above drying step.

Next, the invention of the second group is illustrated.

The process for the production according to the present invention is a method of that under the condition in which thermoplastic polymer (A) in the solid-state is dispersed or suspended in water (B), the thermoplastic polymer (A) is epoxidized by a peroxide (C) as an epoxidizing agent, preferably in addition, of a reaction accelerator (D), with the dispersed state and the like of the polymer in the solid-state maintained and without causing blocking of the polymer before or after, or during the reaction.

To the thermoplastic polymer (A) used in the present invention, those explained as an epoxidation target thermoplastic polymer in the above invention of the first group can be applied. Moreover, the reaction accelerator (D) that is optionally employed in conducting an epoxidation reaction varies depending on the kind of the epoxidation target thermoplastic polymer (A) and the condition of an epoxidation reaction, and the reaction accelerators illustrated in the above invention of the first group can be used. Furthermore, with respect to a peroxide (C) as an epoxidizing agent used in the present invention, the same as the peroxides as an epoxidizing agent used in the invention of the first group can be employed in the same manner as in the invention of the first group. Water (B) is used as a disperse medium in an epoxidation reaction system. It is not particularly restricted, but deionized water is preferred.

In the present invention, the ratio of the charge amounts of the thermoplastic polymer (A), water (B) and the reaction accelerator (D) is preferably 50 to 1000 parts by weight of (B) and 0.5 to 20 parts by weight of (D) in terms of 100 parts by weight of (A). In this case, if the amount of the component (B) is less than 50 parts by weight, the epoxidation target thermoplastic polymer cannot be sufficiently dispersed or suspended. If the amount exceeds 1000 parts by weight, the concentration of the peroxides in the system is lowered, whereby it takes a longer time of epoxidation reaction, which is liable to decrease efficiency of the reaction.

From the viewpoint of the capability to employ the peroxide (C) as an epoxidizing agent with it dissolved, the solubility of the epoxidation target thermoplastic polymer, and easiness of recovering the organic solvent (reaction accelerator) that is a step after an epoxidation reaction, among the above reaction accelerators (D), for example, cyclohexane (the solubility parameter value, that is, SP value is 8.2), ethyl acetate (SP value 9.1), chloroform (SP value 9.3), toluene (SP value 8.9), xylene (SP value 8.8), methyl ethyl ketone (SP value 9.3), benzene (SP value 9.2), tetrahydrofuran (SP value 9.1) and the like are preferred. These may be used singly or as a mixed solvent of two or more. These organic solvents as a reaction accelerator (D) are preferably selected depending on the kind of the epoxidation target thermoplastic polymer. The organic solvents have the functions of infiltrating into the inside the thermoplastic polymer (A) in solid state, transporting a peroxide as an epoxidizing agent to the inside at the same time, and thereby epoxidizing even the inside of the thermoplastic polymer (A). Thus an organic solvent is chosen on the basis that the organic solvent can dissolve and swell the thermoplastic polymer (A) and can infiltrate into the inside of the polymer.

The used amount of the reaction accelerator (organic solvent) (D) that is optionally used in carrying out an epoxidation reaction is preferably 0.5 to 20 parts by weight in terms of 100 parts by weight of the thermoplastic polymer (A) in the case of the solubility parameter value of the reaction accelerator being less than 9.0. In this case, if the charge amount of the reaction accelerator (D) is less than 0.5 parts by weight, the amount as the reaction accelerator for the reaction of the thermoplastic polymer (A) and the peroxide (C) is insufficient, whereby it takes a longer time of an epoxidation reaction, that is, the reaction is not efficient. Furthermore, if the amount exceeds 20 parts by weight, dissolution occurs on the surface of the pellets or powder (hereinafter, except for examples, referred to simply as "pellets") of the polymer subjected to the epoxidation reaction, and blocking among the pellets of the thermoplastic polymer is caused, whereby dispersion by the stirring operation during epoxidation reaction is sometimes difficult. Thus the epoxidation reaction in a dispersed state is liable to be insufficient, and also it is sometimes difficult to take out the epoxidized product from the reaction vessel.

If the solubility parameter value of the reaction accelerator is 9.0 or more, even if the amount of the reaction accelerator (D) is increased, the reaction can proceed without causing a blocking phenomenon, depending on the kind of the thermoplastic polymer (A) as described below.

For instance, if the thermoplastic polymer (A) is a styrene-butadiene copolymer and is a linear or branched polymer represented by the general formula: $a-(b-a)_n$ ($n \geq 1$, a is polystyrene, b is polybutadiene or its partially hydrogenated product), it is preferred that the reaction is carried out in a system where 50 to 1000 parts by weight of water (B) and 0.5 to 30 parts by weight of the reaction accelerator (D) are employed in terms of 100 parts by weight of the thermoplastic polymer (A).

In this case, if the charge amount of the reaction accelerator (D) is less than 0.5 parts by weight, the amount as the reaction accelerator for the reaction of the thermoplastic polymer (A) and the peroxide (C) is insufficient, whereby it takes a longer time of the epoxidation reaction, that is, the efficiency of the reaction can be deteriorated.

Furthermore, if the amount exceeds 30 parts by weight, dissolution occurs on the surface of the pellets of the polymer subjected to the epoxidation reaction, and blocking among the pellets of the thermoplastic polymer is caused, whereby dispersion by the stirring operation during the epoxidation reaction is sometimes difficult. Thus the epoxidation reaction in a dispersed state is liable to be insufficient, and also it is sometimes difficult to take out the epoxidized product from the reaction vessel.

Moreover, if the thermoplastic polymer used is a styrene-butadiene copolymer, and is a polymer represented by the general formula $(a-b)_m$ ($m \geq 2$, a and b is the same as above), or is constituted by a mixture of those represented by the general formula $(a-b)_m$ that is the same as the above and $a-(b-a)_n$ ($n \geq 1$, a and b is the same as the above), it is preferred that 50 to 1000 parts by weight of water (B) and 0.5 to 100 parts by weight of the reaction accelerator (D) are used in terms of 100 parts by weight of the thermoplastic polymer (A).

This is because the polymer has a diblock structure of $(a-b)_m$ ($m \geq 2$, a is polystyrene, b is polybutadiene or its partially hydrogenated product) as shown by the general formula and one terminal of a molecule in the diblock structure is the polybutadiene structure, and on the one hand, the terminals of a molecule in a triblock structure of the general formula: $a-(b-a)_n$ ($n \geq 1$, a and b is the same as the above) are the polystyrene structure. That is, in the case of the triblock structure, both of the terminals have the polystyrene structure, whereas in the case of the diblock structure, one terminal has the polybutadiene structure. Accordingly the solubility in the reaction accelerator (D) is different, as a result, it is possible to increase the reaction accelerator.

Considering this reason, from the viewpoint of the relationship between a molecular structure and a SP value, in the case of the structure of the general formula $(a-b)_m$, in which a molecular terminal has the butadiene structure, its SP value is 8.4, and if what has a SP value of 9.0 or more is used as a reaction accelerator, the difference of both the SP values is great. As a result, the solubility becomes poor, so that no blocking is caused. This seems to be because the amount of the reaction accelerator used can to be increased.

Conversely, in the case of the structure of the general formula $a-(b-a)_n$, in which the molecular terminals have the polystyrene structure, its SP value is 9.1, and if what has a SP value of 9.0 or more is used as a reaction accelerator, the difference of both the SP values is small. As a result, the solubility is great, so that blocking is considered to be caused. Therefore, in this case, the upper limit of the amount of the reaction accelerator used becomes smaller.

Furthermore, also in the case where the thermoplastic polymer (A) used is at least one polymer selected from the group consisting of a butadiene polymer, an isoprene polymer, a styrene-isoprene copolymer, an acrylonitrile-butadiene copolymer, an ethylene-propylene-diene terpolymer and the partially hydrogenated products of these thermoplastic polymers, the difference of the SP values from organic solvents having a SP value of 9.0 or more is great. Therefore, it is considered that 50 to 1000 parts by weight of water (B) and 0.5 to 100 parts by weight of the reaction accelerator (D) can be used in terms of 100 parts by weight of the thermoplastic polymer (A).

In the epoxidation according to the process of the present invention, the oxirane oxygen content of the epoxidized product obtained can be controlled by changing a reaction mole ratio between the number of double bonds in the epoxidation target thermoplastic polymer (A) and the epoxidizing agent (C). This reaction mole ratio varies depending on a level of the oxirane oxygen content of the epoxidized product obtained, and the reaction mole ratio of the pure content of the peroxide to the number of double bonds contained in the epoxidation target thermoplastic polymer (A) can be chosen in the range of 1.0 to 3.0, and particularly preferably of 1.1 to 2.5. The oxirane oxygen content of the epoxidized thermoplastic polymer obtained is preferably controlled in the range of 0.1 to 5.0% by weight.

Moreover, it is preferred that an epoxidation is carried out under the condition of the epoxidation reaction controlled so that the content of gels of the epoxidized thermoplastic polymer obtained is 5% by weight or less as a ratio of the insoluble portion in toluene at 25° C. (the ratio to the whole sample of the epoxidized thermoplastic polymer). Furthermore, with respect to the reaction condition for the production, the reaction temperature, the pressure of the reaction system and the reaction time described in the invention of the first group as described above can be applied.

According to the process for the production of the present invention, the reaction liquid after finishing the epoxidation reaction is in a state where the epoxidized thermoplastic polymer obtained is dispersed or suspended in the solid state in water, and the reaction liquid is obtained as a suspension in which an organic solvent and a carboxylic acid are dissolved in water. To separate and recover the resulting epoxidized product in solid state from the dispersion or suspension, methods of filtration, centrifugal separation and the like may be employed. The epoxidized product obtained in the solid state thus separated and recovered is washed with water to remove a solvent, a carboxylic acid and the like that are attached on the surface.

It is preferred to go to the next step, that is, a step of removing a solvent, after adding a heat-resistant stabilizer to the polymer in solid state separated by the above method. This is because the addition of the heat-resistant stabilizer is effective for preventing the polymer from suffering deterioration by oxidation and heat in removing a solvent. Such a heat-resistant stabilizer may be directly added to the solid product, or maybe dissolved in a hydrocarbon solvent to be added. As a heat-resistant stabilizer, conventionally known materials such as phenol stabilizers, phosphorus stabilizers and the like may be employed.

These stabilizers are used in the amount of 0.01 to 3 parts by weight, preferably of 0.05 to 3 parts by weight, and more preferably of 0.1 to 2 parts by weight in terms of 100 parts by weight of the polymer. The above phenol stabilizers may be used in combination with two or more. If the amount of the phenol stabilizers used is less than 0.01 parts by weight, the effect on improvement in heat resistance and color tone is not recognized. Conversely if the amount exceeds 3 parts by weight, the effect exceeding the effect within the scope of the present invention is not exerted.

Subsequently the product obtained is dried and manufactured. The term "drying of the product" used herein means that at least one dryer such as a screw extruder type dryer, a kneader type dryer, an expander dryer and a hot air dryer is used, whereby the moisture content of the product is reduced to lower than 1% by weight. Of the above dryers, a particularly suitable dryer is a screw extruder type dryer, and in this type, a uniaxial or multiaxial (such as biaxial and the like) screw vented extruder type dryer is preferred.

The dehydration step and the drying step in the present invention can be conducted with an apparatus into which a dehydrator and a dryer are unified. A suitable apparatus for such an apparatus is a vented extruder that is biaxial or more and has at least one slit, preferably 2 to 4 slits for dehydration, and at least one vent portion, preferably 2 to 4 vent portions for deaeration.

In the process of the present invention, various additives can be added to the polymer depending on purposes. For example, softeners such as oils and the like, plasticizers, antistatic agents, lubricants, ultraviolet absorbers, flame retardants, pigments, inorganic fillers, organic or inorganic fibers, reinforcing agents such as carbon black and the like as well as other thermoplastic resins and the like can be used as an additive. It is preferred that these additives are added to the polymer before conducting the drying step.

EXAMPLES

The invention of the first group is further illustrated with reference to the following examples. However, the invention should not in any way be construed as being limited to the following description so long as the description is within the substance of the present invention. In the following description, all "parts" and "%" sign are based on "by weight" unless otherwise noted.

The oxirane oxygen content and the content of gels in an epoxidized product were measured by the following methods.

Oxirane oxygen content: measured according to ASTM-1652.

The content of gels: about 0.1 g of an epoxidized thermoplastic copolymer was added to 10 ml of toluene, and after stirring and dissolving for 3 hours at 25° C., the solution obtained was passed through a 200-mesh wire screen, and the dry weight of gels that had not been allowed to pass through the wire screen was measured to indicate by the unit sign of % by weight in terms of the weight of the epoxidized thermoplastic copolymer.

Example 1-1

In a 3 l four-necked round-bottomed flask equipped with a stirrer, a thermometer, a dropping funnel and a reflux condenser, 300 g of the pellets (particle size converted into a sphere: 3.5 mm) of a block copolymer of polystyrene-polybutadiene-polystyrene (SBS) [produced by Japan Synthetic Rubber Co.; trade name TR2000] and 500 g of water were respectively placed, and were stirred so as to be well mixed, whereby the SBS pellets were well dispersed in water. The temperature inside the flask was warmed to 40° C. To this mixture, a mixed solution of 42 g of a 30% peracetic acid solution in ethyl acetate and 0.02 g of sodium tripolyphosphate was continuously added dropwise over 0.5 hour, and epoxidation was conducted with stirring at 40° C. for 4 hours (measured from the start of dropwise addition of the peracetic acid solution, hereinafter in the same manner unless otherwise noted).

Subsequently, 42 g of a 30% peracetic acid solution in ethyl acetate was continuously added dropwise over 0.5 hour. After the completion of dropping, the epoxidation reaction was carried out for 2 hours. Furthermore, 84 g of a 30% peracetic acid solution in ethyl acetate was continuously added dropwise over 1 hour. After the completion of dropping, the epoxidation reaction was conducted for 10 hours. These reactions proceeded without causing blocking among the pellets.

After the completion of the reaction, a solid substance was filtrated and recovered from the reaction liquid, and washed with deionized water. From the solid substance recovered, water and remaining solvents were removed under reduced pressure at 120° C., whereby 300 g of an epoxy-modified SBS was obtained. The individual pellets of the modified SBS thus obtained had a structure of being covered by a shell-like surface layer insoluble in toluene at 25° C. (this was confirmed by the fact that when the pellets were slowly dissolved in toluene at 25° C., shell-like insoluble gels remained on the surface of the pellets.) The content of gels derived from the shell-like surface layer was 12.0% by weight, and the oxirane oxygen content of the dissolved portion was 1.5% by weight. Moreover, the oxirane oxygen content of the pellets after kneading was 1.74% (this indicates the average value of the oxirane oxygen content of the whole pellets.)

Example 1-2

In a four-necked round-bottomed flask that is the same as used in EXAMPLE 1-1, 300 g of the pellets (particle size converted into a sphere: 3.5 mm) of a block copolymer of polystyrene-polybutadiene-polystyrene (SBS) [produced by Japan Synthetic Rubber Co., Ltd.; trade name TR2000] and 600 g of water were respectively placed, and were stirred so as to be well mixed, whereby the SBS pellets were well dispersed in water. The temperature inside the flask was warmed to 40° C. To this mixture, a mixed solution of 42 g of a 30% peracetic acid solution in ethyl acetate and 0.02 g of sodium tripolyphosphate was continuously added dropwise over 0.5 hour. After the completion of dropping, the epoxidation was conducted with stirring at 40° C. for 4 hours.

Subsequently, a mixed solution of 42 g of a 30% peracetic acid solution in ethyl acetate and 0.02 g of sodium tripolyphosphate was continuously added dropwise over 0.5 hour. After the completion of dropping, the epoxidation reaction was carried out for 2 hours. Furthermore, 84 g of a 30% peracetic acid solution in ethyl acetate was continuously added dropwise over 1 hour. After the completion of dropping, the epoxidation reaction was conducted for 10 hours. The reactions proceeded without causing blocking among the pellets.

After the completion of the reaction, a granular solid substance was filtrated and recovered from the reaction liquid, and then washed with deionized water. From the solid substance recovered, water and remaining solvents were removed under reduced pressure at 120° C., whereby 300 g of an epoxy-modified SBS having a shell-like surface layer insoluble in toluene at 25° C. was obtained. The modified SBS had a structure of being covered by the above shell-like surface layer insoluble in toluene (this was confirmed in the same manner as in EXAMPLE 1-1.) The content of gel components was 7.8% by weight, and the oxirane oxygen content of the dissolved portion was 2.1% by weight. Moreover, the oxirane oxygen content after kneading was 2.23%.

Example 1-3

In a four-necked round-bottomed flask that is the same as used in EXAMPLE 1-1, 300 g of the pellets (particle size converted into a sphere: 3.8 mm) of a block copolymer of polystyrene-polybutadiene-polystyrene (SBS) [produced by Asahi Kasei Corp.; trade name Asaflex 810] and 500 g of water were respectively placed, and were stirred so as to be well mixed, whereby the SBS pellets were well dispersed in water. The temperature inside the flask was warmed to 40° C. To this mixture, a mixed solution of 63 g of a 30% peracetic acid solution in ethyl acetate and 0.03 g of sodium tripolyphosphate was continuously added dropwise over 0.5 hour. After the completion of dropping, the epoxidation was conducted with stirring at 40° C. for 5 hours, and at this point, 54 g of ethyl acetate was continuously added dropwise over 0.5 hour. Epoxidation reaction was carried out for 12 hours in total. The reactions proceeded without causing blocking among the pellets.

After the completion of the reaction, solid pellets were filtrated and recovered from the reaction liquid, and then washed with deionized water. From the pellets recovered, water and remaining solvents were removed under reduced pressure at 120° C., whereby 300 g of an epoxy-modified SBS pellets having a shell-like surface layer insoluble in toluene at 25° C. (this was confirmed in the same manner as in EXAMPLE 1-1) was obtained. The content of gels was 3.2% by weight, and the oxirane oxygen content of the dissolved portion was 1.0% by weight in the SBS. Moreover, the oxirane oxygen content after kneading was 1.11%.

Example 1-4

In a four-necked round-bottomed flask that is the same as used in EXAMPLE 1-1, 300 g of the pellets (particle size converted into a sphere: 3.9 mm) of a block copolymer of polystyrene-polyisoprene-polystyrene (SIS) [produced by Shell Co.; trade name KRATON D1117] and 600 g of water were respectively placed, and were stirred so as to be well mixed, whereby the SIS pellets were well dispersed in water. The temperature inside the flask was warmed to 40° C. To this mixture, a mixed solution of 164 g of a 30% peracetic acid solution in ethyl acetate and 0.09 g of sodium tripolyphosphate was continuously added dropwise over 2 hour. After the completion of dropping, the epoxidation was conducted with stirring at 40° C. for 6 hours. The reactions proceeded without causing blocking among the pellets.

After the completion of the reaction, solid pellets were filtrated and recovered from the reaction liquid, and then washed with deionized water. The pellets recovered were heated to 120° C. under reduced pressure, whereby water and remaining solvents were removed, and 300 g of an epoxy-modified SIS polymer pellets on which a shell-like surface layer insoluble in 25° C. toluene are formed (this was confirmed in the same manner as in EXAMPLE 1-1) was obtained. The content of gels of the modified pellets was 14.5% by weight, and the oxirane oxygen content of the dissolved portion was 1.4% by weight. Moreover, the oxirane oxygen content after kneading was 1.72%.

Example 1-5

In a four-necked round-bottomed flask that is the same as used in EXAMPLE 1-1, 300 g of the pellets (particle size converted into a sphere: 3.4 mm) of a copolymer of polyacrylonitrile-polybutadiene (NBR) [produced by Nippon Zeon Co., Ltd.; Nipol NBR DN214] and 600 g of water were respectively placed, and were stirred so as to be well mixed, whereby the pellets were well dispersed in water. The temperature inside the flask was warmed to 40° C. To this mixture, a mixed solution of 63 g of a 30% peracetic acid solution in ethyl acetate and 0.03 g of sodium tripolyphosphate was continuously added dropwise over 1 hour, the epoxidation was conducted with stirring at 40° C. for 8 hours. The reactions proceeded without causing blocking among the pellets.

After the completion of the reaction, solid pellets were filtrated and recovered from the reaction liquid, and then washed with deionized water. From the pellets recovered, water and remaining solvents were removed under reduced pressure, whereby 299 g of an epoxy-modified NBR polymer on which a shell-like surface layer insoluble in toluene at 25° C. are formed (this was confirmed in the same manner as in EXAMPLE 1-1) was obtained. The content of gel components was 2.5% by weight, and the oxirane oxygen content of the dissolved portion was 1.1% by weight in the NBS polymer. Moreover, the oxirane oxygen content after kneading was 1.21%.

The invention of the second group is further illustrated with reference to the following examples. All "parts" and "%" sign used in the examples are based on "by weigh" unless otherwise noted.

The oxirane oxygen content and the content of gels in the epoxidized product according to the following examples were measured by the methods as described in the invention of the first group.

Example 2-1

In a 1 l four-necked round-bottomed flask equipped with a stirrer, a thermometer, a dropping funnel and a reflux condenser, 100 g of the ground product, which is a 7.5 mesh-pass product (having a number average molecular weight by the GPC method of 5300), of the pellets of an ethylene-propylene-diene terpolymer (EPDM) having an iodine value of 10, and 200 g of water as a solvent were placed, and were stirred so as to be well mixed, whereby the EPDM ground product was well dispersed in water. The temperature inside the flask was warmed to 40° C. With this temperature maintained, 12.0 g of a peracetic acid solution in ethyl acetate having purity of 30% and 10 g of cyclohexane were added dropwise in the flask with the dropping funnel over about 30 minutes, thereby being allowed to undergo a reaction. The reaction was further conducted at this temperature for 8 hours (the SP value of the accelerator was 8.6 as a weighted average value of both solvents, and the amount used was 18.4 parts by weight in terms of 100 parts by weight of the raw material polymer, in the following examples and comparative examples, it was calculated in the same manner in case of a mixed solvent). The reaction proceeded without generating masses. After the completion of the reaction, a solid substance was recovered by filtration, and washed with deionized water in the same amount as the reaction liquid. Furthermore, the solid substance was dried under reduced pressure to remove water and the like, whereby 99.0 g of an epoxidized EPDM was obtained. The oxirane oxygen content was 0.5%, and the content of gels was 0.1% in the epoxidized EPDM obtained. Moreover, the oxirane oxygen content after kneading (this indicates the average value of the oxirane oxygen content of the whole particles) was 0.52%.

Example 2-2

In a four-necked round-bottomed flask that is the same as used in EXAMPLE 2-1, 100 g of the commercially available pellet product (having a number average molecular weight by the GPC method of 5300) (particle size converted into a sphere: 2.3 mm) of an ethylene-propylene-diene terpolymer (EPDM) and 200 g of water as a solvent were placed, and were stirred so as to be well mixed, whereby the EPDM pellets were well dispersed in water. The temperature inside the flask was warmed to 40° C. With this temperature maintained, 12.0 g of a peracetic acid solution in ethyl acetate having purity of 30% and 10 g of cyclohexane were added dropwise with the dropping funnel over about 30 minutes to undergo a reaction. The reaction was further conducted at this temperature for 8 hours (the SP value of the accelerator was 8.6, and the amount used was 18.4 parts by weight). The reactions proceeded without causing blocking among the pellets.

After the completion of the reaction, a solid substance was recovered by filtration, and then washed with deionized water in the same amount as the reaction liquid. Furthermore, the solid substance was dried under reduced pressure to remove water and the like, whereby 100 g of an epoxidized EPDM was obtained (substantially the same weight as the raw material). The oxirane oxygen content was 0.5%, and the content of gels was 0.08% in the epoxidized EPDM obtained. Moreover, the oxirane oxygen content after kneading was 0.2%.

Example 2-3

In a 3 l four-necked round-bottomed flask equipped with a stirrer, a thermometer, a dropping funnel and a reflux condenser, 300 g of the pellets (particle size converted into a sphere: 3.5 mm) of a block copolymer of polystyrene-polybutadiene-polystyrene (SBS) [produced by Japan Synthetic Rubber Co.; trade name TR2000] and 500 g of water were respectively placed, and were stirred so as to be well mixed, whereby the SBS pellets were well dispersed in water. The temperature inside the flask was warmed to 40° C. To this mixture, 42 g of a 30% peracetic acid solution in ethyl acetate was continuously added drop wise over 0.5 hour. After the completion of dropping, the epoxidation was conducted with stirring at 40° C. for 8 hours (the SP value of the accelerator was 9.1, and the amount used was 9.8 parts by weight). The reaction proceeded without causing blocking among the pellets.

After the completion of the reaction, a solid substance was recovered by filtration from the reaction liquid, and then washed with deionized water. From the solid substance recovered, water and remaining solvents were removed under reduced pressure, whereby 300 g of an epoxidized SBS was obtained. The oxirane oxygen content was 0.70%, and the content of gels was 0.36% in the epoxidized SBS obtained. Moreover, the oxirane oxygen content after kneading was 0.75%.

Example 2-4

In a four-necked round-bottomed flask that is the same as used in EXAMPLE 2-3, 300 g of the pellets (particle size converted into a sphere: 3.5 mm) of a block copolymer of polystyrene-polybutadiene-polystyrene (SBS) [produced by Japan Synthetic Rubber Co.; trade name TR2000] and 500 g of water were respectively placed, and were stirred so as to be well mixed, whereby the SBS pellets were well dispersed in water. The temperature inside the flask was warmed to 30° C. To this mixture, 42 g of a 30% peracetic acid solution in ethyl acetate was continuously added dropwise over 0.5 hours. After the completion of dropping, the epoxidation was conducted with stirring at 30° C. for 9 hours (the SP value of the accelerator was 9.1, and the amount used was 9.8 parts by weight). The reaction proceeded without causing blocking among the pellets.

After the completion of the reaction, a solid substance was recovered by filtration from the reaction liquid, and then washed with deionized water. From the solid substance recovered, water and remaining solvents were removed under reduced pressure, whereby 300 g of an epoxidized SBS was obtained. The oxirane oxygen content was 0.55%, and the content of gels was 0.04% in the epoxidized SBS obtained. Moreover, the oxirane oxygen content after kneading was 0.56%.

Example 2-5

In a four-necked round-bottomed flask that is the same as used in EXAMPLE 2-3, 300 g of the pellets (particle size converted into a sphere: 3.5 mm) of a block copolymer of polystyrene-polybutadiene-polystyrene (SBS) [produced by Japan Synthetic Rubber Co.; tradename TR2000] and 500 g of water were respectively placed, and were stirred so as to be well mixed, whereby the SBS pellets were well dispersed in water. The temperature inside the flask was warmed to 40° C. To this mixture, 168 g of a 15% peracetic acid aqueous solution was continuously added dropwise over 2 hours. Furthermore, 30 g of cyclohexane was added dropwise over 0.25 hour. After the completion of dropping, the epoxidation was conducted with stirring at 40° C. for 6 hours (the SP value of the accelerator was 8.2, and the amount used was 10 parts by weight). The reaction proceeded without causing blocking among the pellets.

After the completion of the reaction, a solid substance was recovered by filtration from the reaction liquid, and then washed with deionized water. From the solid substance recovered, water was removed under reduced pressure, whereby 300 g of an epoxidized SBS was obtained. The oxirane oxygen content was 1.0%, and the content of gels was 0.88% in the epoxidized SBS obtained. Moreover, the oxirane oxygen content after kneading was 1.10%.

Example 2-6

In a four-necked round-bottomed flask that is the same as used in EXAMPLE 2-3, 300 g of the pellets (particle size converted into a sphere: 3.8 mm) of a block copolymer of polystyrene-polybutadiene-polystyrene (SBS) [produced by Asahi Kasei Corp.; trade name Asaflex 810] and 500 g of water were respectively placed, and were stirred so as to be well mixed, whereby the SBS pellets were well dispersed in water. The temperature inside the flask was warmed to 40° C. To this mixture, 84 g of a 30% peracetic acid solution in ethyl acetate was continuously added dropwise over 1 hour. After the completion of dropping, the epoxidation was conducted with stirring at 40° C. for 7 hours (the SP value of the accelerator was 9.1, and the amount used was 19.6 parts by weight). The reaction proceeded without causing blocking among the pellets.

After the completion of the reaction, a solid substance was recovered by filtration from the reaction liquid, and then washed with deionized water. From the solid substance recovered, water and remaining solvents were removed under reduced pressure, whereby 300 g of an epoxidized SBS was obtained. The oxirane oxygen content was 0.89%, and the content of gels was 0.3% in the epoxidized SBS obtained. Moreover, the oxirane oxygen content after kneading was 0.91%.

Example 2-7

In a four-necked round-bottomed flask that is the same as used in EXAMPLE 2-3, 300 g the pellets (particle size converted into a sphere: 4.3 mm) of a block copolymer of polystyrene-polybutadiene-polystyrene (SBS) [produced by Shell Co.; trade name KRATON D1118, the content of the diblock: 80%] and 600 g of water were respectively placed, and were stirred so as to be well mixed, whereby the SBS pellets were well dispersed in water. The temperature inside the flask was warmed to 40° C. To this mixture, 42 g of a 30% peracetic acid solution in ethyl acetate was continuously added dropwise over 0.5 hours. After the completion of dropping, the epoxidation was conducted with stirring at 40° C. for 6 hours (the SP value of the accelerator was 9.1, and the amount used was 9.8 parts by weight.) The reaction proceeded without causing blocking among the pellets.

After the completion of the reaction, a solid substance was recovered by filtration from the reaction liquid, and then washed with deionized water. From the solid substance recovered, water and remaining solvents were removed under reduced pressure, whereby 300 g of an epoxidized SBS polymer was obtained. The oxirane oxygen content was 0.75%, and the content of gels was 0.03% in the epoxidized SBS obtained. Moreover, the oxirane oxygen content after kneading was 0.77%.

Example 2-8

In a four-necked round-bottomed flask that is the same as used in EXAMPLE 2-3, 300 g of the crumbs (particle size converted into a sphere: 4.3 mm) of a block copolymer of polystyrene-polybutadiene-polystyrene (SBS) [produced by Shell Co.; trade name KRATON D1118] and 600 g of water were respectively placed, and were stirred so as to be well mixed, whereby the SBS crumbs were well dispersed in water. The temperature inside the flask was warmed to 40° C. To this mixture, 126 g of a 30% peracetic acid solution in ethyl acetate was continuously added dropwise over 15 hours. After the completion of dropping, the epoxidation was conducted with stirring at 40° C. for 6 hours (the SP value of the accelerator was 9.1, and the amount used was 29.4 parts by weight). The reaction proceeded without causing blocking among the crumbs.

After the completion of the reaction, a solid substance was recovered by filtration from the reaction liquid, and then washed with deionized water. From the solid substance recovered, water and remaining solvents were removed under reduced pressure, whereby 300 g of an epoxidized SBS polymer was obtained. The oxirane oxygen content was 2.2%, and the content of gels was 1.1% in the epoxidized SBS obtained. Moreover, the oxirane oxygen content after kneading was 2.35%.

Example 2-9

In a four-necked round-bottomed flask that is the same as used in EXAMPLE 2-4, 300 g of the pellets (particle size converted into a sphere: 3.9 mm) of a block copolymer of polystyrene-polyisoprene-polystyrene (SIS) [produced by Shell Co.; trade name KRATON D1117] and 600 g of water were respectively placed, and were stirred so as to be well mixed, whereby the SIS pellets were well dispersed in water. The temperature inside the flask was warmed to 40° C. To this mixture, 164 g of a 30% peracetic acid solution in ethyl acetate was continuously added dropwise over 2 hours. After the completion of dropping, the epoxidation was conducted with stirring at 40° C. for 6 hours (the SP value of the accelerator was 9.1, and the amount used was 38.2 parts by weight). The reaction proceeded without causing blocking among the pellets.

After the completion of the reaction, a solid substance was recovered by filtration from the reaction liquid, and then washed with deionized water. From the solid substance recovered, water and remaining solvents were removed under reduced pressure, whereby 300 g of an epoxidized SIS polymer was obtained. The oxirane oxygen content was 2.2%, and the content of gels was 3.5% in the epoxidized SIS obtained. Moreover, the oxirane oxygen content after kneading was 2.41%.

Example 2-10

In a four-necked round-bottomed flask that is the same as used in EXAMPLE 2-3, 300 g of the pellets (particle size converted into a sphere: 3.9 mm) of a block copolymer of polystyrene-polyisoprene-polystyrene (SIS) [produced by Shell Co.; trade name KRATON D1117] and 600 g of water were respectively placed, and were stirred so as to be well mixed, whereby the SIS pellets were well dispersed in water. The temperature inside the flask was warmed to 40° C. To this mixture, 168 g of a 15% peracetic acid aqueous was continuously added dropwise over 2 hours. Furthermore, 30 g of cyclohexane was added dropwise over 0.25 hour. After the completion of dropping, the epoxidation was conducted with stirring at 40° C. for 6 hours (the SP value of the accelerator was 8.2, and the amount used was 10 parts by weight). The reaction proceeded without causing blocking among the pellets.

After the completion of the reaction, a solid substance was recovered by filtration from the reaction liquid, and then washed with deionized water. From the solid substance recovered, water and remaining solvents were removed under reduced pressure, whereby 300 g of an epoxidized SIS polymer was obtained. The oxirane oxygen content was 1.3%, and the content of gels was 1.5% the epoxidized SIS obtained. Moreover, the oxirane oxygen content after kneading was 1.42%.

Comparative Example 2-1

In a four-necked round-bottomed flask that is the same as used in EXAMPLE 2-3, 300 g of the pellets (particle size converted into a sphere: 3.5 mm) of a block copolymer of polystyrene-polybutadiene-polystyrene (SBS) [produced by Japan Synthetic Rubber Co.; trade name TR2000] and 500 g of water were respectively placed, and were stirred so as to be well mixed, whereby the SBS pellets were well dispersed in water. The temperature inside the flask was warmed to 40° C. To this mixture, 168 g of a 30% peracetic acid solution in ethyl acetate was continuously added dropwise over 2 hours. After the completion of dropping, blocking among the pellets occurred and the stirrer was stopped, so the reaction was discontinued (the SP value of the accelerator was 9.1, and the amount used was 39.2 parts by weight).

Comparative Example 2-2

In a four-necked round-bottomed flask that is the same as used in EXAMPLE 2-3, 300 g of the pellets (particle size converted into a sphere: 3.8 mm) of a block copolymer of polystyrene-polybutadiene-polystyrene (SBS) [produced by Asahi Kasei Corp.; trade name Asaflex810] and 500 g of water were respectively placed, and were stirred so as to be well mixed, whereby the SBS pellets were well dispersed in water. The temperature inside the flask was warmed to 40° C. To this mixture, 168 g of a 30% peracetic acid solution in ethyl acetate was continuously added dropwise over 2 hours. After the completion of dropping, blocking among the pellets occurred and the stirrer was stopped, so the reaction was discontinued (the SP value of the accelerator was 9.1, and the amount used was 39.2 parts by weight).

INDUSTRIAL APPLICABILITY

The epoxidized granular thermoplastic polymer and the process for the production of the same according to the invention of the first group have a particularly advantageous effect as follows, and the industrial practical value is extremely great. That is, the epoxidized granular thermoplastic polymer according to the present invention has a specific structure having a shell-like surface layer insoluble in toluene at 25° C. This structure solves the problems such as adherence that the epoxidized thermoplastic polymer itself has, handling based on blocking and the like, workability and the like. Furthermore, since the above specific surface structure is formed, blocking among granules and the like can be prevented, and the polymer can be used as granules for the purpose of modification of other resins and the like, and although it sparingly contains gels, a homogeneous dispersion state with other resins can be obtained without any trouble.

According to the process for the production of an epoxidized thermoplastic polymer of the invention of the second group, an epoxidation target thermoplastic polymer such as diene resins or rubber polymers and the like that have double bonds in the molecule and are in solid state at ordinary temperature is dispersed or suspended in water, and then epoxidation has only to be conducted. It is not necessary to dissolve the polymer in a solvent, and blocking is not caused in a heterogeneous system, and the process has an advantageous effect so that epoxidation can be easily carried out. Therefore the industrial practical value is extremely great.

What is claimed is:

1. A process for the production of an epoxidized granular thermoplastic polymer, said polymer characterized in that the polymer comprises a shell-like surface layer insoluble in toluene at 25° C. formed on the polymer, and which is prepared by epoxidizing after a granular thermoplastic polymer has been suspended in water, wherein said process comprises:

a first step of epoxidizing a granular thermoplastic polymer in a water medium in the presence of an epoxidizing agent or the epoxidizing agent and a solvent for accelerating an epoxidation reaction, and a phosphoric acid series compound to produce an epoxidized granular thermoplastic polymer;

a second step of the washing with water, or the neutralization and washing with water of the epoxidized granular thermoplastic polymer; and a third step, if necessary, of removing the solvent for accelerating the epoxidation reaction which may be used in the first step.

2. A process for the production of an epoxidized granular thermoplastic polymer according to claim 1, wherein peracetic acid is used as the epoxidizing agent in the first step.

3. A process for the production of an epoxidized granular thermoplastic according to claim 1, wherein the solubility parameter value of the solvent for accelerating the epoxidation reaction that may be used in the first step is 10 or less.

4. A process for the production of an epoxidized granular thermoplastic polymer according to claim 1, wherein the washing with water, or the neutralization and washing with water in the second step is a separation operation of solid and liquid for separating the polymer to be supplied to the third step.

5. A process for the production of an epoxidized granular thermoplastic polymer according to 1, wherein the removing of the solvent in the third step is carried out by drying the polymer obtained in the second step with the granular form of the polymer maintained.

6. A process for the production of an epoxidized granular thermoplastic polymer according to claim 1, wherein the oxirane oxygen content in the epoxidized granular thermoplastic polymer is in the range of 0.3 to 5.0% by weight.

7. A process for the production of an epoxidized granular thermoplastic polymer according to claim 1, wherein the content of gels in the epoxidized granular thermoplastic polymer is 0.5% by weight or more.

8. A process for the production of an epoxidized thermoplastic polymer, characterized in that under the condition in which a thermoplastic polymer in the solid-state is dispersed or suspended in water, the thermoplastic polymer is epoxidized by a peroxide with the dispersed or suspended state maintained and in that a particle size converted into a sphere of the thermoplastic polymer is in the range of 0.05 to 7 mm.

9. A process for the production of an epoxidized thermoplastic polymer according to claim 8, wherein the thermoplastic polymer is at least one polymer selected from the group consisting of a butadiene polymer, a styrene-butadiene copolymer, an isoprene polymer, a styrene-isoprene copolymer, an acrylonitrile-butadiene copolymer, an ethylene-propylene-diene terpolymer and partially hydrogenated products of these polymers or copolymers.

10. A process for the production of an epoxidized thermoplastic polymer according to claim 8, wherein in addition to the peroxide, a reaction accelerator is further used.

11. A process for the production of an epoxidized thermoplastic polymer according to claim 10, wherein one of more organic solvents that can dissolve or swell the thermoplastic polymer are used as the reaction accelerator.

12. A process for the production of an epoxidized thermoplastic polymer according to claim 10, wherein an organic solvent having a solubility parameter of less than 9.0 is used as the reaction accelerator and 50 to 1000 parts by weight of water and 0.5 to 20 parts by weight of the reaction accelerator are used in terms of 100 parts by weight of the thermoplastic polymer.

13. A process for the production of an epoxidized thermoplastic polymer according to claim 12, wherein the reaction accelerator is a single or mixed solvent of one or more solvents selected from the group consisting of cyclohexane, toluene, and xylene.

14. A process for the production of an epoxidized thermoplastic polymer according to claim 10, wherein the thermoplastic polymer is styrene-butadiene copolymer and also a linear or branched polymer represent by the general formula: a–(b–a)$_n$ (n≧1, a is a polystyrene, and b is a polybutadiene or its partially hydrogenated product), and 50 to 1000 parts by weight of water and 0.5 to 30 parts by weight of the reaction accelerator which is an organic solvent having a solubility parameter of 9.0 or more are used in terms of 100 parts by weight of thermoplastic polymer.

15. A process for the production of an epoxidized thermoplastic polymer according to claim 10, wherein the thermoplastic polymer is at least one polymer, copolymer, mixture of copolymers or mixture thereof selected from the group consisting of (1) a styrene-butadiene copolymer represented by the general formula: (a–b)$_m$ (m≧2, a is a polystyrene, and b is polybutadiene or its partially hydrogenated product, herein after meant in the same way), (2) a mixture of styrene-butadiene copolymers represent by the general formula a–(b–a)$_n$ (n≧1), respectively, and the above general formula (a–b)$_m$ (3) a butadiene polymer, (4) an isoprene polymer, (5) a styrene-isoprene copolymer, (6) an acrylonitrile-butadiene copolymer, (7) an ethylene-propylene-diene terpolymer, and (8) partially hydrogenated products of one or more members optionally selected from (1) to (7) and 50 to 1000 parts by weight of water and 0.5 to 100 parts by weight of the reaction accelerator which is an organic solvent having a solubility parameter of 9.0 or more used in terms of 100 parts by weight of the thermoplastic polymer.

16. A process for the production of an epoxidized thermoplastic polymer according to claim 14, wherein the reaction accelerator is a single or mixed solvent of one or more solvents selected from the group consisting of ethyl acetate, tetrohydrofuran, benzene, methyl ethyl ketone, and chloroform.

17. A process for the production of an epoxidized thermoplastic polymer according to claim 8, wherein peracetic acid, or other percarboxylic acid derived by hydrogen peroxide is used as the peroxide.

18. A process for the production of an epoxidized thermoplastic polymer according to claim 17, wherein peracetic acid is used as the peroxide.

19. A process for the production of an epoxidized thermoplastic polymer according to claim 9, wherein the peroxide diluted with the reaction accelerator is used.

20. A process for the production of an epoxidized thermoplastic polymer according to claim 8, wherein the temperature of the epoxidation reaction of the thermoplastic polymer is in the range of 10 to 70° C.

21. A process for the production of an epoxidized thermoplastic polymer according to claim 8, wherein the oxirane oxygen content derived from the epoxy groups in the epoxidized thermoplastic polymer is controlled in the range of 0.1 to 5.0% by weight.

22. A process for the production of an epoxidized thermoplastic polymer according to claim 8, wherein the content of gels in the epoxidized thermoplastic polymer is controlled in the range of 5% by weight or less.

* * * * *